United States Patent [19]

Sano

[11] Patent Number: 6,079,885
[45] Date of Patent: Jun. 27, 2000

[54] PRINTER WITH VARIABLE IMAGE PROCESSING CORRESPONDING TO IMAGE SIZE

[75] Inventor: Homare Sano, Sagamihara, Japan

[73] Assignee: Minolta Co., Ltd., Osaka, Japan

[21] Appl. No.: 08/960,084

[22] Filed: Oct. 24, 1997

Related U.S. Application Data

[63] Continuation of application No. 08/489,592, Jun. 12, 1995, abandoned.

[30] Foreign Application Priority Data

Jun. 14, 1994 [JP] Japan .................................... 6-132310

[51] Int. Cl.[7] ....................................... B41J 5/30
[52] U.S. Cl. ............................... 400/76; 400/70; 400/63; 400/61
[58] Field of Search ................................ 400/61, 63, 76, 400/70; 395/102, 109, 112, 114, 115, 117; 358/296

[56] References Cited

U.S. PATENT DOCUMENTS

| 5,079,624 | 1/1992 | Sasuga et al. ............................ 358/75 |
| 5,392,061 | 2/1995 | Vondran, Jr. ............................. 347/252 |
| 5,398,311 | 3/1995 | Seto ......................................... 395/151 |
| 5,485,278 | 1/1996 | Nakajima ................................ 358/296 |
| 5,550,638 | 8/1996 | Ikeda et al. ............................. 358/296 |

FOREIGN PATENT DOCUMENTS

| 62-92684 | 4/1987 | Japan ..................................... 395/129 |
| 2-213282 | 8/1990 | Japan ................................ 400/120.02 |

*Primary Examiner*—Ren Yan
*Assistant Examiner*—Charles H. Nolan, Jr.
*Attorney, Agent, or Firm*—Sidley & Austin

[57] ABSTRACT

A printer allows changing the number of images printed on a single sheet of said recording medium, changing the layout of the print images, and changing the size of the print images. Said printer is provided with a means for determining whether or not each printed image size is larger or smaller than a predetermined size by comparing the size of a print image with a predetermined size. High quality print images are obtained by accomplishing image processing for contrast emphasis when an image is small than a predetermined size, and accomplishing image processing for edge emphasis when an image is larger than a predetermined size.

19 Claims, 8 Drawing Sheets

PRINTER WITH VARIABLE IMAGE PROCESSING CORRESPONDING TO IMAGE SIZE

CROSS REFERENCE TO RELATED APPLICATION

This is a continuation of U.S. patent application Ser. No. 08/489,592 filed Jun. 12, 1995, now abandoned.

BACKGROUND OF THE INVENTION

Conventional thermal transfer printers of a sublimation type or a fusing type form a color image by overlaying on a recording sheet an ink film having a thin layer of ink of one among three colors cyan, yellow, and magenta or four colors including black arrayed lengthwise one color at a time, and sequentially transferring ink each color cyan, yellow, and magenta (and black) onto the recording sheet by applying heat to the ink film via a thermal head. Furthermore, conventional TA (thermo-auto-chroma) printers form a color image by performing a plurality of image formations at different temperatures corresponding to colors via a thermal head on a special recording sheet having characteristics which are different for an applied color depending on the applied temperature.

In the aforesaid printers, image data input to the printer is subjected to image processing including contrast emphasis, edge emphasis, color correction and the like. High quality images can be produced by outputting image data which has been subjected to such image processing.

The amount of correction performed in image processing is set by the user to produce a desired image after the user visually examines an image output from the printer. Thus, until an image is produced which satisfies the user, it is necessary to repeatedly set the amount of correction performed in image processing and visually examining the output images.

As an example using the aforesaid printer an output device, there are services which output the images of single film frames on paper as positive images in order to readily see a plurality of images on a negative film at a facility for developing photographic film. This type of process is called index printing. The index printing method is briefly described below. Using an image reader (not shown in the drawings), images on the negative film are read frame by frame, subjected to negative-to-positive conversion, and the read image frames input to the printer in frame units. The printer outputs a plurality of input image frames on paper in a layout such as, for example, those shown in FIGS. 4, 5, and 6. Thus, an index print is completed. The previously mentioned negative-to-positive conversion may be accomplished by the image reader, or by the printer, or by a host computer of an embodiment described later. The size of individual image frames of an index print may be varied in accordance with the layout of a plurality of image frames on a single recording sheet. Thus, although image processing corresponding to image frame size is necessary, such image processing corresponding to image frame size is not accomplished in conventional printers.

When forming a plurality of images of different sizes on a single recording sheet, there is a mixture of images subjected to optimum image processing and image not subjected to optimum processing if said image formation is accomplished without changing the amount of correction of image processing when forming images of a single recording sheet. In such circumstances, high quality image formation is not achieved for all images of the recording sheet.

SUMMARY OF THE INVENTION

A first object of the invention is to provide a printer capable of optimum image processing in accordance with the size of each printed image to produce high quality prints by changing the type of image processing and the amount of correction corresponding to the size of each printed image.

A second object of the present invention is to provide a printer having a calculation means for calculating the size of image data of each printed image, memory means for storing predetermined image data sizes, and means for determining whether or not each printed image size is larger or smaller than a predetermined size by comparison therewith, and wherein high quality print images are obtained by accomplishing image processing for contrast emphasis when an image is small than a predetermined size, and accomplishing image processing for edge emphasis when an image is larger than a predetermined size.

A third object of the present invention is to provide a printer having a memory means for storing output formats corresponding to the number of images output on a single recording sheet, and selection means for selecting a single output format among the output formats stored in said memory means, and a means for accomplishing image processing corresponding to a selected output format so as to produce high quality prints.

A fourth object of the present invention is to provide a printer having a memory means for storing output formats corresponding to the number of images output on a single recording sheet, a selection means for selecting a single output format among the output formats stored in said memory means, and a selection means for selecting contrast emphasis or edge emphasis corresponding to an output format selected by so as to produce high quality prints.

A fifth object of the present invention is to provide a printer which accomplishes optimum image processing corresponding to the size of each print image by changing the type of image processing and amount of correction in accordance with the size of each print image so as to produce high quality prints.

A sixth object of the present invention is to provide a printer which allows changing the size of the recording medium, changing the number of images printed on a single sheet of said recording medium, changing the layout of the print images, and changing the size of the print images, said printer being provided with a means for determining whether or not each printed image size is larger or smaller than a predetermined size by comparing the size of a print image with predetermined sizes, and wherein high quality print images are obtained by accomplishing image processing for contrast emphasis when an image is small than a predetermined size, and accomplishing image processing for edge emphasis when an image is larger than a predetermined size.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The preferred embodiments of the present invention are described hereinafter.

Figure 1:
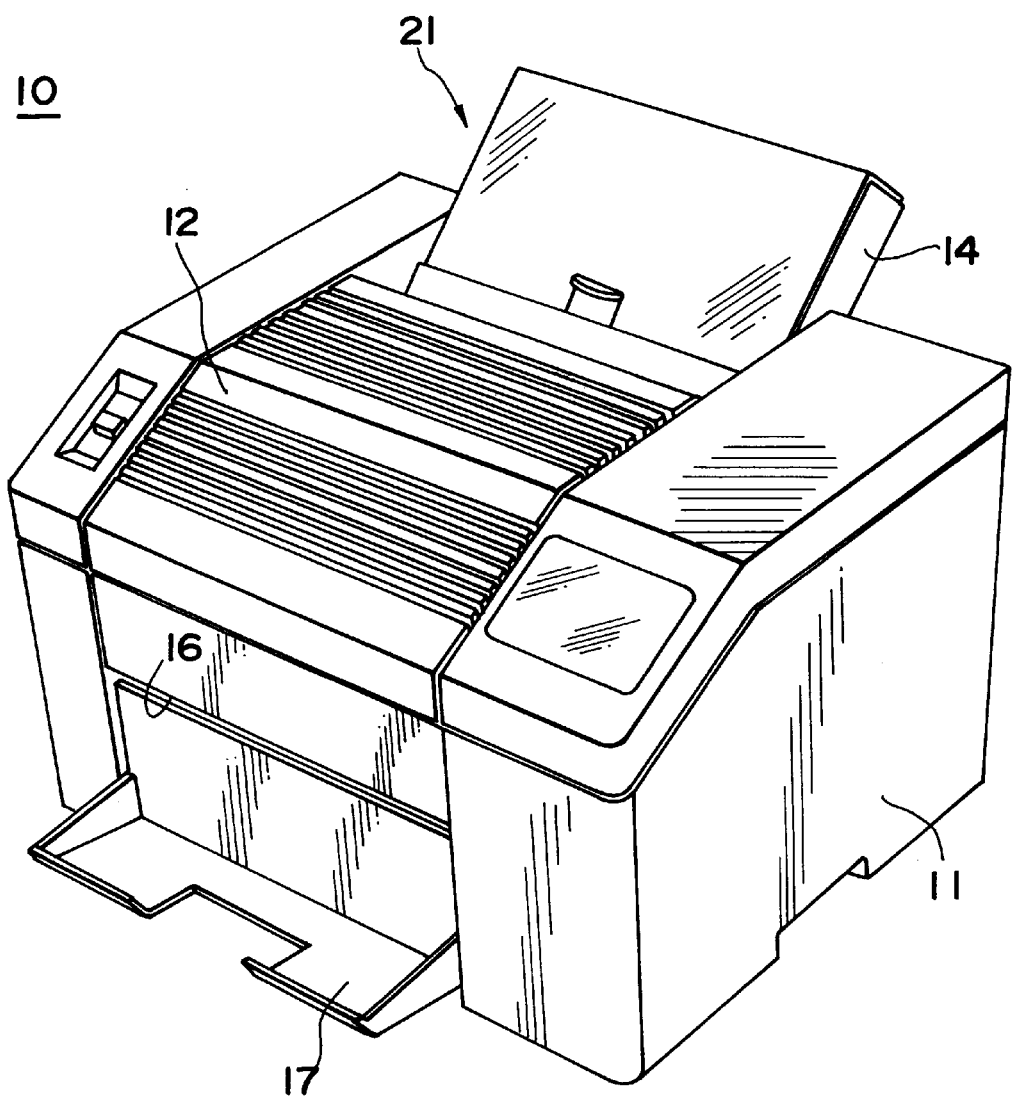
FIG. 1 is an exterior perspective view of an embodiment of a thermal transfer printer of the present invention.

FIG. 1 is an exterior perspective view of an embodiment of the thermal transfer printer of the present invention.

Thermal transfer printer 10 in the drawing is used, for example, in a location where photographic prints are made. In order to make a plurality of images on the negative readily visible, a service is provided at the developing location to output on a recording sheet the images of the film as positive images. This process is called index printing. The index printing method is briefly described below. First, the image on the negative is read frame by frame using an image reader (not illustrated), the read image is subjected to negative-to-positive conversion, and the read image frames ares input to a printer in frame units. The printer arranges the input plurality of image frames in layouts such as, for example, those shown in FIGS. 4, 5, and 6, and outputs said images on a recording sheet. Thus, index printing is accomplished. The previously mentioned negative-to-positive conversion may be accomplished by the image reader or by the printer, or by a host computer as described later in an embodiment of the invention.

Figure 2:
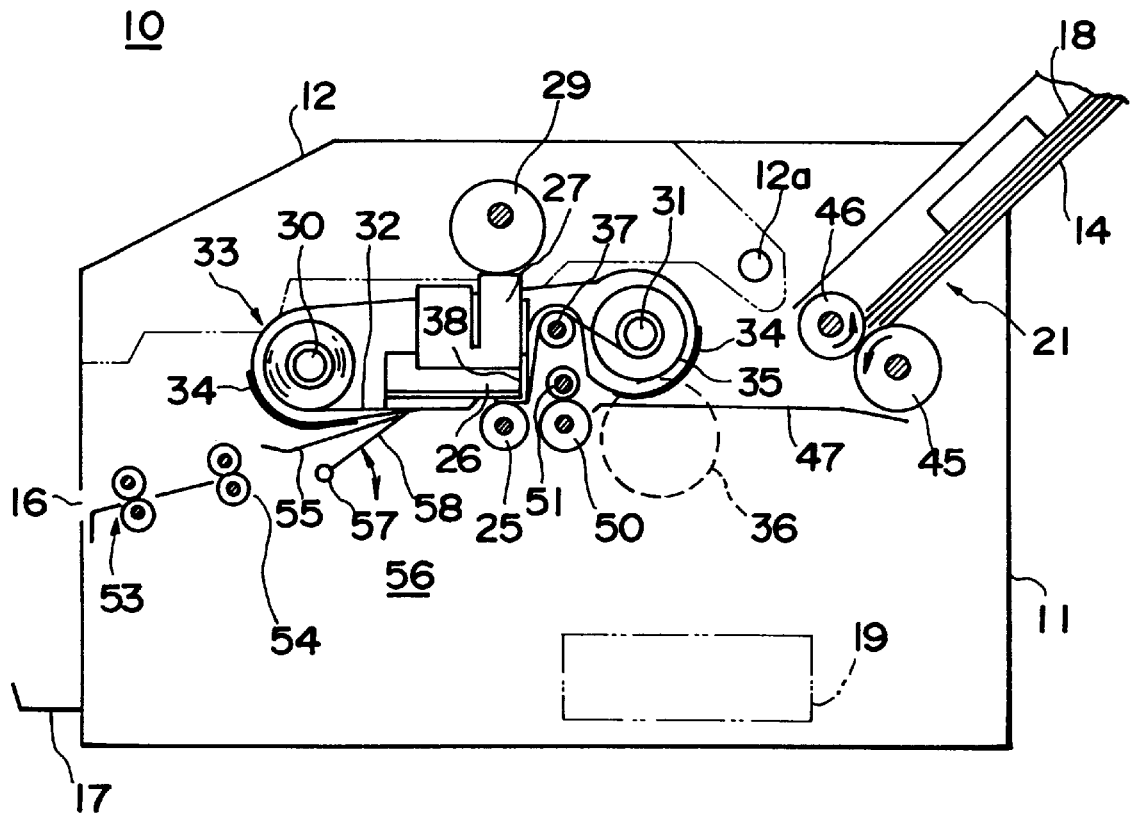
FIG. 2 is a brief section view of a thermal transfer printer loaded with an ink film cassette.

Cover 12 is mounted on the top surface of housing 11 of thermal transfer printer 10 so as to be openable upon shaft 12a (refer to FIG. 2). With cover 12 in an open state, an ink film cassette is loaded at a predetermined position in housing 11. The front of thermal transfer printer 10 is shown at the left front side in FIG. 1. Sheet discharge aperture 16 and discharge tray 17 are provided on the front side of printer 10, and sheet feeding section 21 is provided at the back. Sheet feeding section 21 comprises a paper tray 14 installed at an incline relative to the printer body. Paper tray 14 accommodates a plurality of recording sheets 18 (refer to FIG. 2). After image formation, recording sheet 18 is discharged through discharge aperture 16 to discharge tray 17.

FIG. 2 is a section view showing the construction of the interior of thermal transfer printer 10 with an ink film cassette loaded. Platen roller 25 is supported so as to be rotatable at a position opposite thermal head 26 within housing 11 of thermal transfer printer 10. Thermal head 26 is integrated with head base 27; head base 27 is mounted on the side of cover 12 so as to be retractable relative to platen roller 25 via a connector member not shown in the drawing. Head base 27 is forced to the retracted position, i.e., a direction in which pressure contact is released, relative to platen roller 25 via an elastic means such as a spring or the like not shown in the drawing. Eccentric cam 29 reciprocally moves head base 27 including thermal head 26 relative to platen roller 25; FIG. 2 shows the state wherein eccentric cam 29 causes pressure contact of head base 27 on platen roller 25. If eccentric cam 29 is rotated ½ rotation from the aforesaid state, head base 27 is retracted from platen roller 25 via the force exerted by an elastic means not shown in the drawing, such that the contact pressure of thermal head 26 is released. A ribbon-like ink film 32 is transported between thermal head 26 and platen roller 25. Ink film 32 comprises a base film coated with ink layers of three colors in the sequence yellow, magenta, and cyan. An ink film additionally including white ink and an overcoat layer may be used as needed. Unused ink ribbon film 32 is rolled upon supply reel 30, and used ink film 32 is rolled up on take-up reel 31. Both supply reel 30 and take-up reel 31 are contained in ink film cassette 33. Ink film cassette 33 is removably installed in housing 11. Ink film 33 is loaded at a fixed position by placing it upon support frame 34 mounted within housing 11. An opening is formed in film cassette 33 such that film take-up drive gear 36 mounted on the printer body and gear 35 mounted on take-up reel 31 engage one another when film cassette 33 is installed. Film take-up roller 37 is rotatably mounted on the side of the printer body and penetrates the interior of film cassette 33 when the cassette is installed. Film take-up roller 37 and the interior wall of film cassette 33 form the transport path of film 32. The surface of film take-up roller 37 comprises a rubber material having high friction resistance. During printing, thermal head 26 come into pressure contact with platen roller 25. Ink film 32 is pulled from supply reel 30 via the friction force with recording sheet 18 transported between platen roller 25 and thermal head 26. Recording sheet 18 and ink film 33 are transported together at the same speed between platen roller 25 and thermal head 26. Film 32 fed out from supply reel 30 is guided by guide panel 38 provided at the leading edge of thermal head 26 and take-up roller 37 via the rotational drive of take-up reel 31 transmitted through gear 35 by drive gear 36, and is rolled up on take-up reel 31. During printing, take-up roller 37 is rotated by the movement of film 32, and functions as a guide for the transport of film 32.

When not printing, thermal head 26 is released from pressure contact with platen roller 25. When threading film 33, film take-up roller 37 is driven by a motor, such that film 32 is pulled from supply reel 30 and rolled up on take-up reel 31 via the friction force between the film and the rotatably driven take-up roller 37.

Recording sheet 18 on feed tray 14 is fed one sheet at a time by feed roller 45 and guide roller 46 arranged so as to provide a small gap relative to said feed roller 45. Recording sheet 18 is guided by guide ember 47 during transport. Motor-driven grip roller 50 is arranged adjacent to platen roller 25 on the upstream side of said platen roller 25, and pinch roller 51 abuts grip roller 50. Recording sheet 18 is transported between rollers 50 and 51.

First pair of discharge rollers 53 are provided at sheet discharge aperture 16 and second pair of discharge rollers 54 are provided at platen roller 25 on the downstream side of platen roller 50 with a predetermined spacing to discharge recording sheet 18 onto discharge tray 17.

Guide member 55 for guiding the transported recording sheet 18 during the discharge process is provided between platen roller 25 and discharge rollers 53 and 54. Space 56 is formed below guide member 55 for accommodating recording sheet 18 during the printing operations.

When reproducing a color image on recording sheet 18 in thermal transfer printer 10 shown in the illustrations, recording sheet 18 is fed from feed tray 14 and accommodated in space 56. Then, from this state, recording sheet 18 is returned to accomplish formation of a yellow color image, i.e., a return printing method. After recording sheet 18 is returned and a yellow image is transferred, recording sheet 18 is advanced in preparation for reproducing the next magenta image. Thus, three color images are overlaid and transferred by a surface sequential method so as to form a color image on recording sheet 18. Thermal head 26 comes into pressure contact with platen roller 25 only during return transport. When recording sheet 18 is advanced, thermal head 26 is separated from platen roller 25. When return transport and advance transport are repeated to accomplish printing, grip roller 50 and pinch roller 51 normally hold recording sheet 18.

Oscillating guide 58 is provided below guide member 58 so as to be oscillatable about support shaft 57 to selectively guide recording sheet 18 transported by grip roller 50 and pinch roller 51 to pairs of discharge rollers 53 and 54 or to space 56. Oscillating guide 58 is formed of a flexible material. When oscillating guide 58 is moved to the top position, a recording sheet 18 transported by grip roller 50 and the like is accommodated in space 56. On the other hand, when oscillating guide 58 is moved in a clockwise direction, recording sheet 18 is transported toward pairs of discharge rollers 53 and 54.

Control unit 19 is built into housing 11 to execute predetermined image processing relative to image signals input from an external control device, as well as control operations of printer 10.

Figure 3:
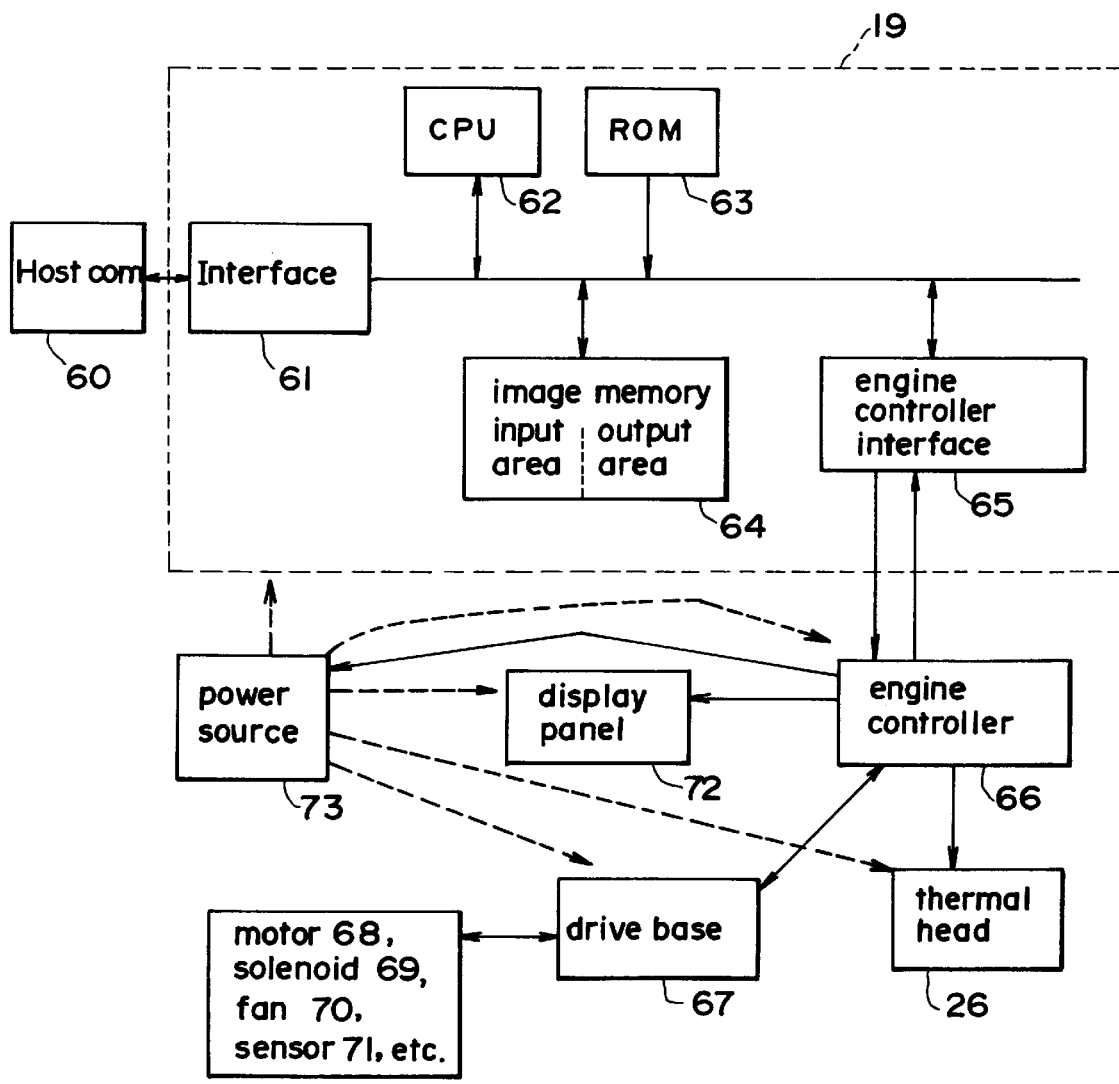
FIG. 3 is a block diagram of an embodiment of a thermal transfer printer.

FIG. 3 is a block diagram of thermal transfer printer 10.

Figure 4:
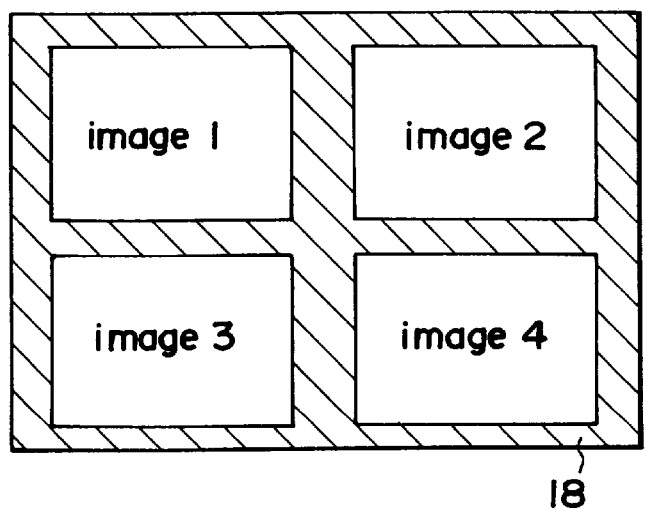
FIG. 4 is an illustration showing an example of output from an embodiment of a thermal transfer printer.
Figure 5:
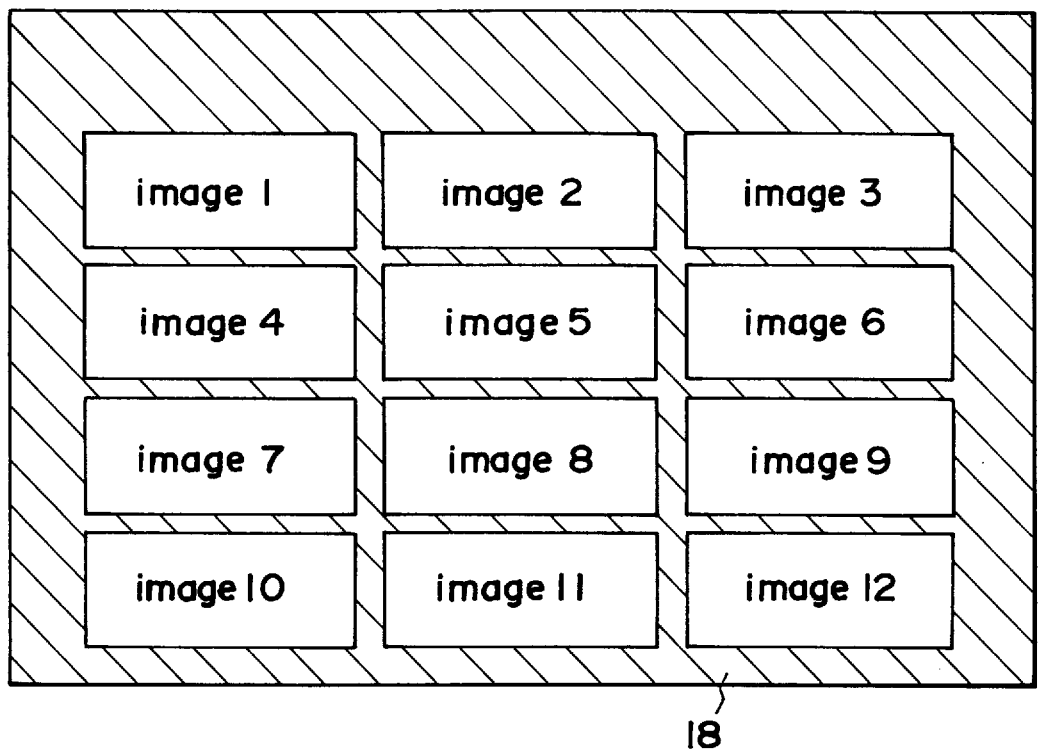
FIG. 5 is an illustration showing another example of output from an embodiment of a thermal transfer printer.
Figure 6:
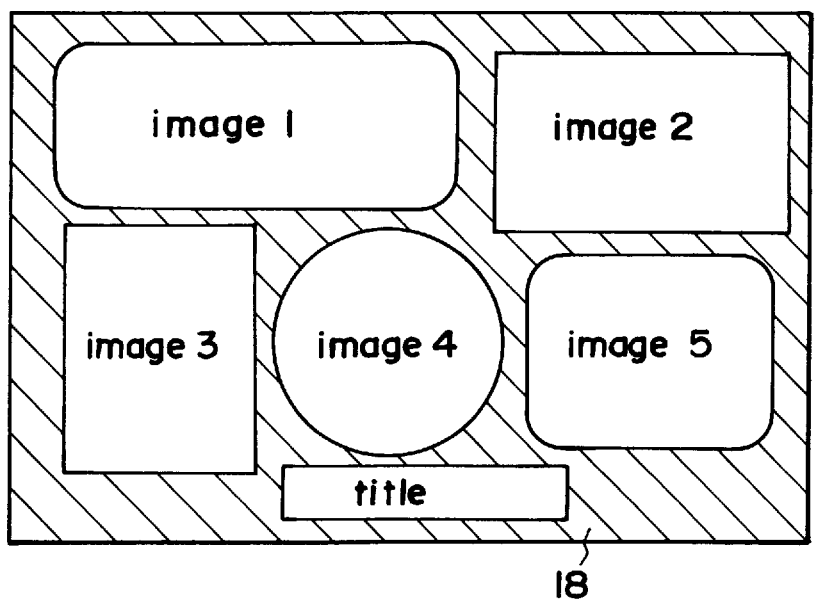
FIG. 6 is an illustration showing still another example of output from an embodiment of a thermal transfer printer.

Host computer 60 is connected to thermal transfer printer 10 via interface 61, and image data of the negative film read by a reading device (not illustrated) from host computer 60 are input to interface 61 of thermal transfer printer 10. Host computer 60 allows a user to input commands relating to the control of thermal transfer printer 10, such as the print command and the like. Commands input by a user into host computer 60 are input to interface 61 of thermal transfer printer 10 as control signals. The section circumscribed by the dashed line in the drawing is control unit 19. Control unit 19 comprises five components which include interface 61, central processing unit (CPU) 62, program read only memory (ROM) 63, image memory 64, and engine controller interface 65. Interface 61 inputs image signals and control signals from host computer 60. CPU 62 executes image processes including edge emphasis, contrast emphasis, and color correction, arranges a plurality of image data transmitted from host computer 60 as shown in FIGS. 4, 5, and 6, and executes engine control such as sheet feeding, starting printing and the like. Data and programs necessary for image processing such as edge emphasis, contrast emphasis, and color correction are stored in program ROM 63. Image memory 64 is provided with an area for storing image data input from host computer 60, and an area for storing output image data already subjected to image processing by CPU 63. Engine controller interface 65 transmits printer engine control signals from CPU 63 to engine controller 66, and receives engine error signals from engine controller 66. Engine controller 66 controls sheet feeding motor 68 connected to drive base 67 and solenoid 69 based on printer engine control signals transmitted from control unit 19, and makes and releases pressure contact of thermal head 26, transports recording sheets 18, and the supply and take-up of ink film 32. Engine controller 66 controls cooling fan 70 to cool the interior of the apparatus. Detection signals for the leading edge position of recording sheet 18 and the leading edge position of ink film 32 are transmitted from sensor 71 to engine controller 66 via the drive base. Engine controller 66 drives thermal head 26 in accordance with image signals transmitted from control unit 19, to execute printing. Display panel 72 displays the state of the printer, including currently printing, interrupted printing, error generation and the like. Power source 73 is a common power supply for each circuit.

FIGS. 4–6 are illustrations showing output examples of the present embodiment of thermal transfer printer 10. The size of recording sheet 18 measures 10 cm vertically by 15 cm horizontally and is the same size a postcard.

In the output example shown in FIG. 4, four individual images are printed on a single recording sheet 18. In the output example shown in FIG. 5, twelve individual images are printed on a single recording sheet 18. In the output example shown in FIG. 6, five individual images of different shapes as well as a lettered title are printed on a single recording sheet 18.

The operating sequence of printer 10 is described hereinafter with reference to the flow charts of FIGS. 7 and 8. The flow charts in the drawings show the image processing of printer 10. Before image data are transmitted to printer 10, color correction image processing is executed as an operator views the image on the monitor of host computer 60.

The sequence for determining whether or not to execute contrast emphasis from the size of each image to be printed is described hereinafter with reference to the flow chart of FIG. 7.

In step S11, image data are transmitted form host computer 60 to thermal transfer printer 10. The image data are negative film images read by an image reader not shown in the drawings. Each frame of the negative film comprises a single unit of image data, and a plurality of image data are input to be printed on a single recording sheet 18.

Image data can be varied in size and shape of image by host computer 60. Color and halftone correction of image data can be accomplished by host computer 60 relative to the printer. The input plurality of image data are stored in the input image memory area of image memory 64.

Then, the size of each input image data is calculated by counting the number of vertical and horizontal data of each input image data by CPU 62 in control unit 19 (step S12). When the size of each image data has been determined, the size of the image data calculated in step S12 is compared to reference data for determining image size stored in program ROM 63, and a determination is made as to whether or not the image data is larger than the reference data (step S13). The "reference size" may change in accordance with user requirements and the size of recording sheet 18. For example, image data size may be compared to a reference size of a rectangular shape of 3 cm vertically and 5.5 cm horizontally which is 1 cm shorter on each edge than a rectangular shape of 5 cm vertically and 7.5 cm horizontally that is ½ the size of a postcard size recording sheet 18 of 10 cm vertically by 15 cm horizontally. The four images shown in FIG. 4 are slightly larger than the reference size. In this comparison, a determination of "larger" may be made only when both vertical and horizontal sides are larger than the reference size, or when either one among vertical or horizontal sizes is larger than the reference size. In the present embodiment, a determination of "larger" is made when either one among vertical or horizontal sizes is larger than the reference size.

When the size of the image to be printed is small, such as when twelve images or twenty images are arranged on a single recording sheet 18, the surface areas of the dark and light portions are narrow due to the abruptness of density change, such that the image appears to have no contrast to the naked eye. At this time, contrast emphasis is accomplished to broaden the surface areas of dark and light sections, and obtain a balance such as in the case of a large image (step S14). Details of contrast emphasis are described later with reference to FIG. 9.

On the other hand, when the size of the image to be printed is large, such as when one or two images are arranged on a single recording sheet 18, the density change is smooth and produces broad surface areas of dark and light sections which are readily visible to the naked eye as images with contrast. In this case, contrast emphasis is not performed.

The processing of steps S13 and S14 are executed for all image data (frames) stored in input image memory (steps S13–S15).

When image processing is completed, each image data (frame) is arranged in an area of the output image memory of image memory 63 (step S16), and subsequently the arranged image data are transmitted to engine controller 66 via engine controller interface 65, and printed by the previously mentioned surface sequential method to print the color image (step S17). Recording sheet 18 bearing the reproduced color image is discharged from printer 10 to discharge tray 17 (step S18).

In the case of FIG. 6, only image 1 is determined to be large, such that contrast emphasis is not performed. The other images 2–5 are determined to be small, such that contrast emphasis is performed. That is, determinations are made as to which areas require image processing and which do not for placement on a single recording sheet 18, such that output images of higher quality are obtained than when all images on the recording sheet receive the same image processing.

In the present embodiment, processing (adjust contrast or not) is divided into two stages according to image size, but a greater number of divisions is possible. For example, the processing may be divided into strong contrast emphasis, weak contrast emphasis, and no contrast emphasis. Furthermore, contrast emphasis need not be made in stages, but rather by changing the degree of contrast emphasis continuously using image size as a parameter.

The sequence for determining whether or not edge emphasis is accomplished from the size of each image to be printed is described below with reference to the flow chart of FIG. 8.

In step S21, thermal transfer printer 10 receives image data, and control unit 19 calculates the size of each image to be printed based on the received image data (step S22). When image size calculations have been completed, a determination is made as to whether or not the size of the image during printing is larger than a predetermined size (step S23).

When the image to be printed is large, edge emphasis is performed because the density change is smooth (step S24).

On the other hand, when the image to be printed is small, edge emphasis is not performed because the density change is abrupt.

The processing of steps S23 and S24 are performed on all images (frames) to be printed (steps S23–S25).

After image processing ends and the layout of each image (frame) is completed (step S26), printing is accomplished by the surface sequential method as recording sheet 18 is return transported, so as to print a color image (step S27). The recording sheet on which the color image has been reproduced is discharged from the printer onto discharge tray 17 (step S28).

When the images to be printed are of different sizes, the images receiving edge emphasis and images not receiving edge emphasis may be mixed on a single recording sheet 18.

In the present embodiment, processing (adjust edge or not) is divided into two stages according to image size, but a greater number of divisions is possible. For example, the processing may be divided into strong edge emphasis, weak edge emphasis, and no edge emphasis. Furthermore, edge emphasis need not be made in stages, but rather by changing the degree of edge emphasis continuously using image size as a parameter.

Figure 7:
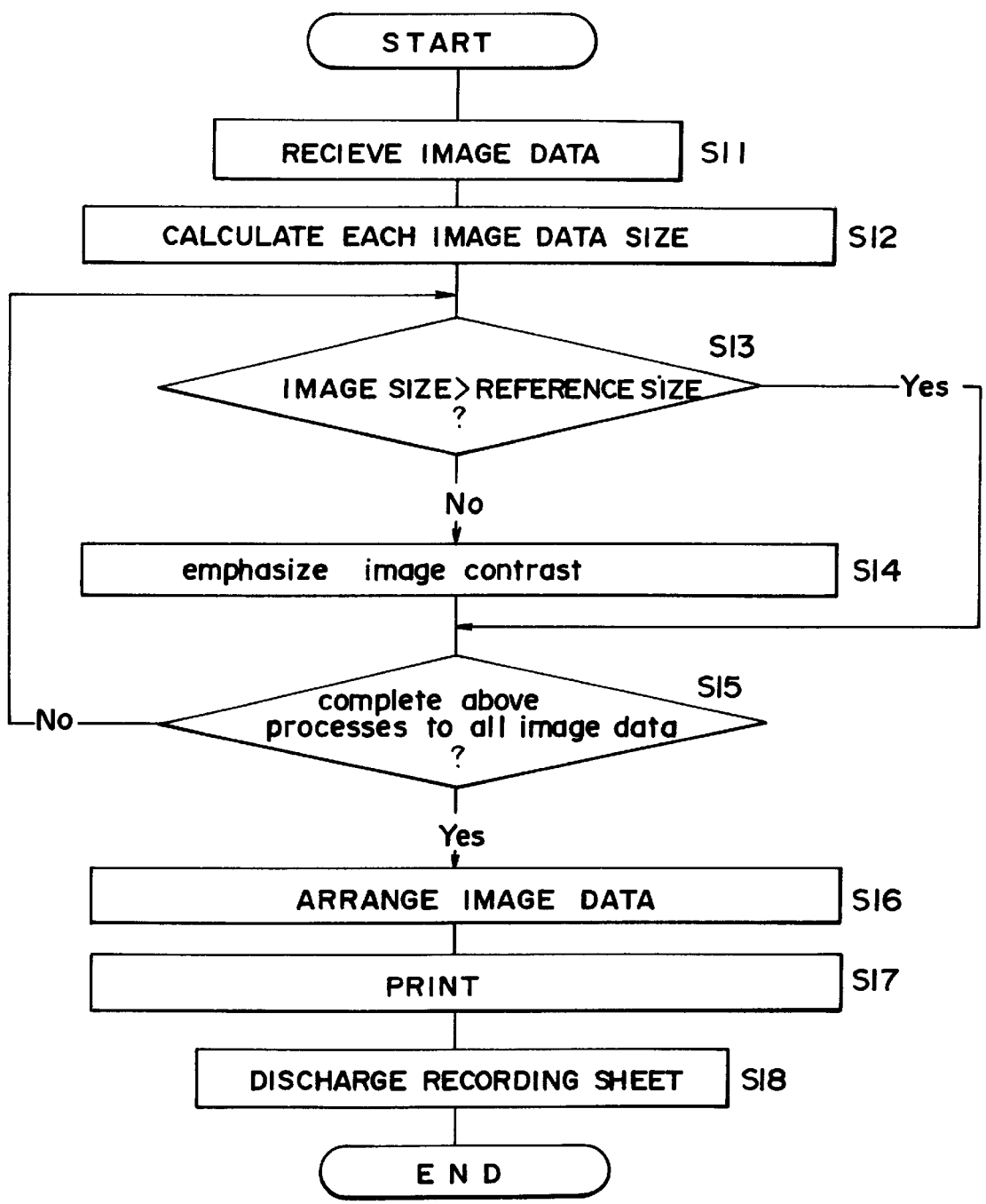
FIG. 7 is a flow chart showing the sequence for determining whether or not to execute contrast emphasis from the size of each print image.
Figure 8:
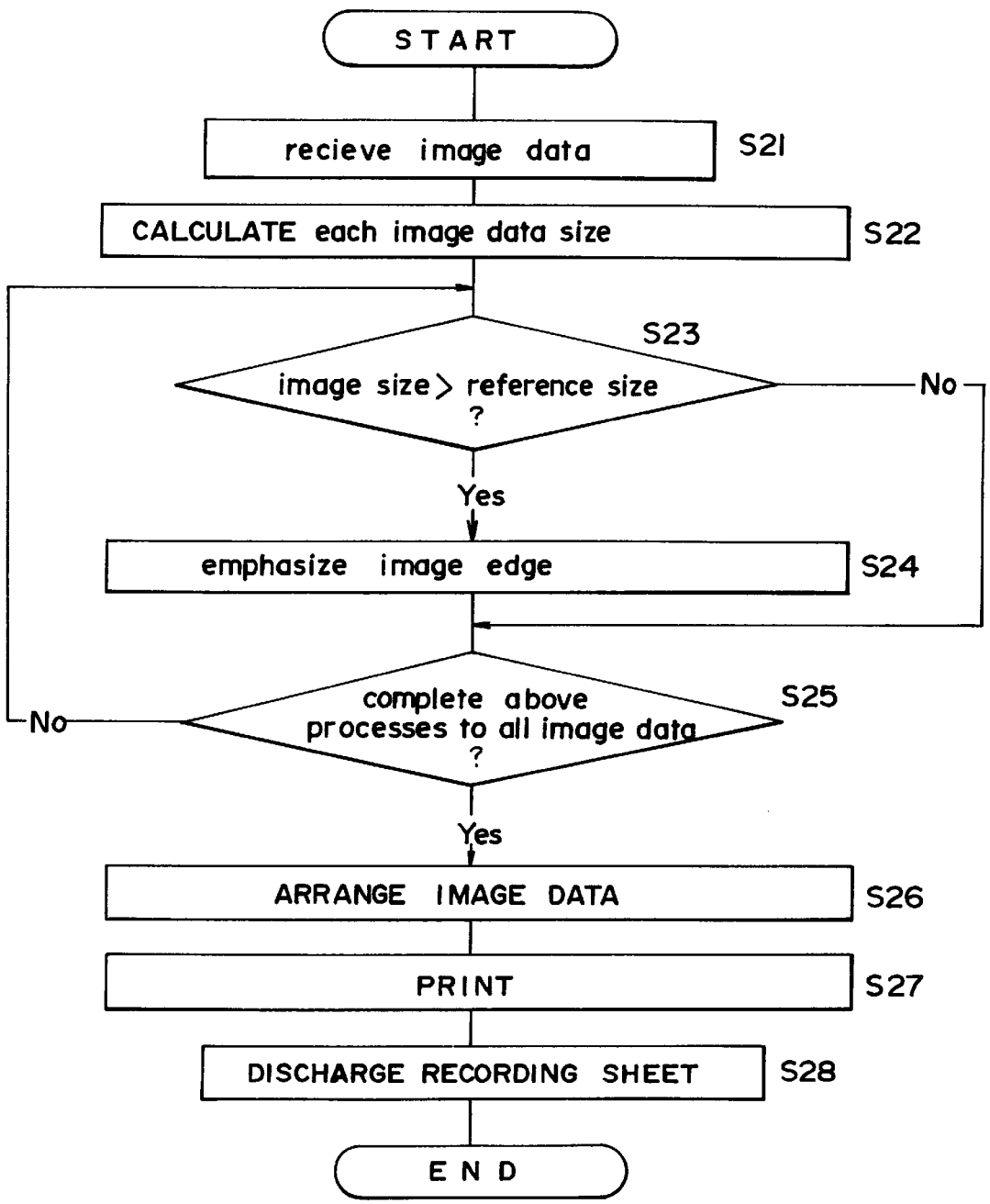
FIG. 8 is a flow chart showing the sequence for determining whether or not to execute edge emphasis from the size of each print image.
Figure 9:
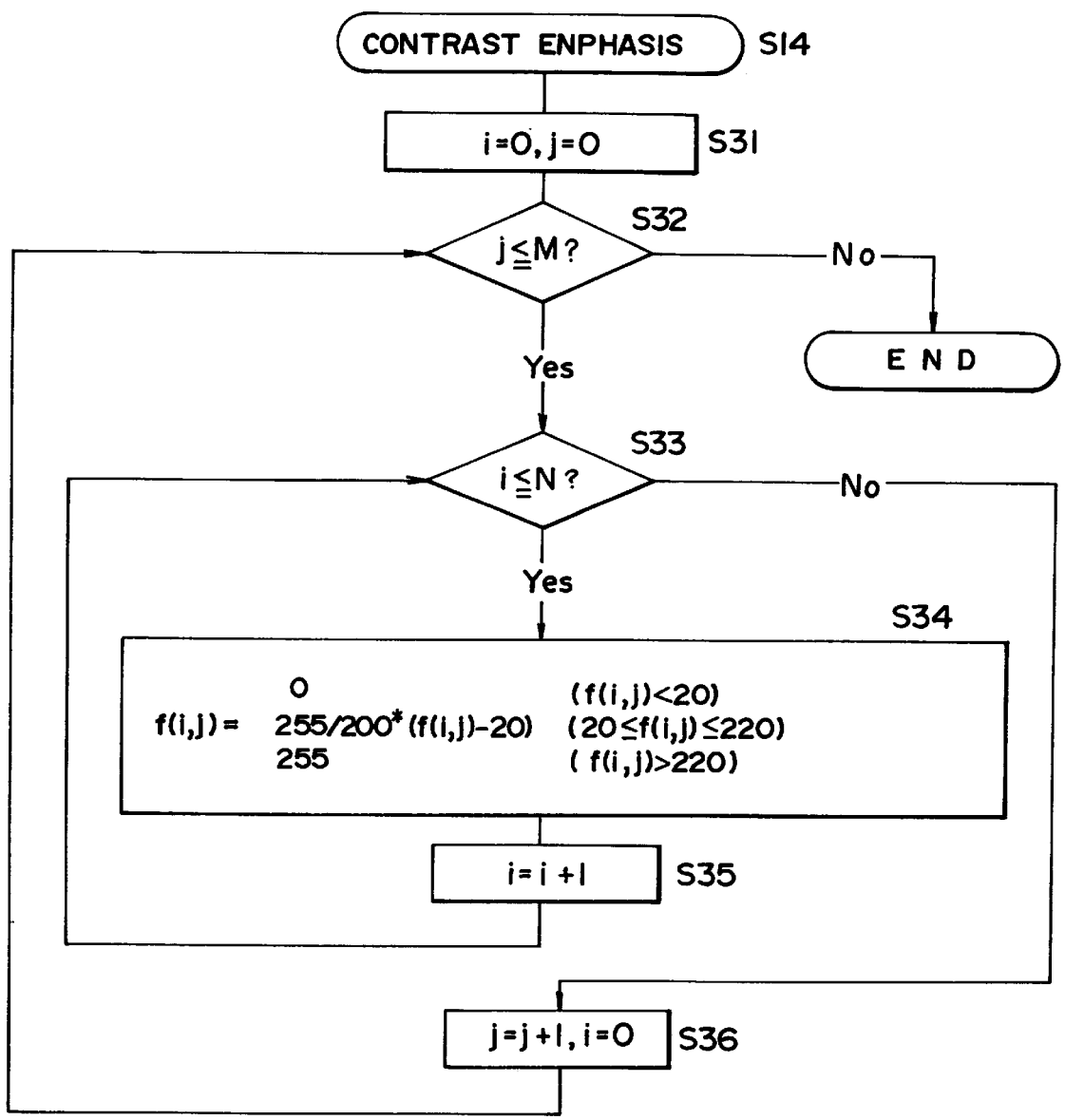
FIG. 9 is a flow chart showing the sequence relating to contrast emphasis.
Figure 10:
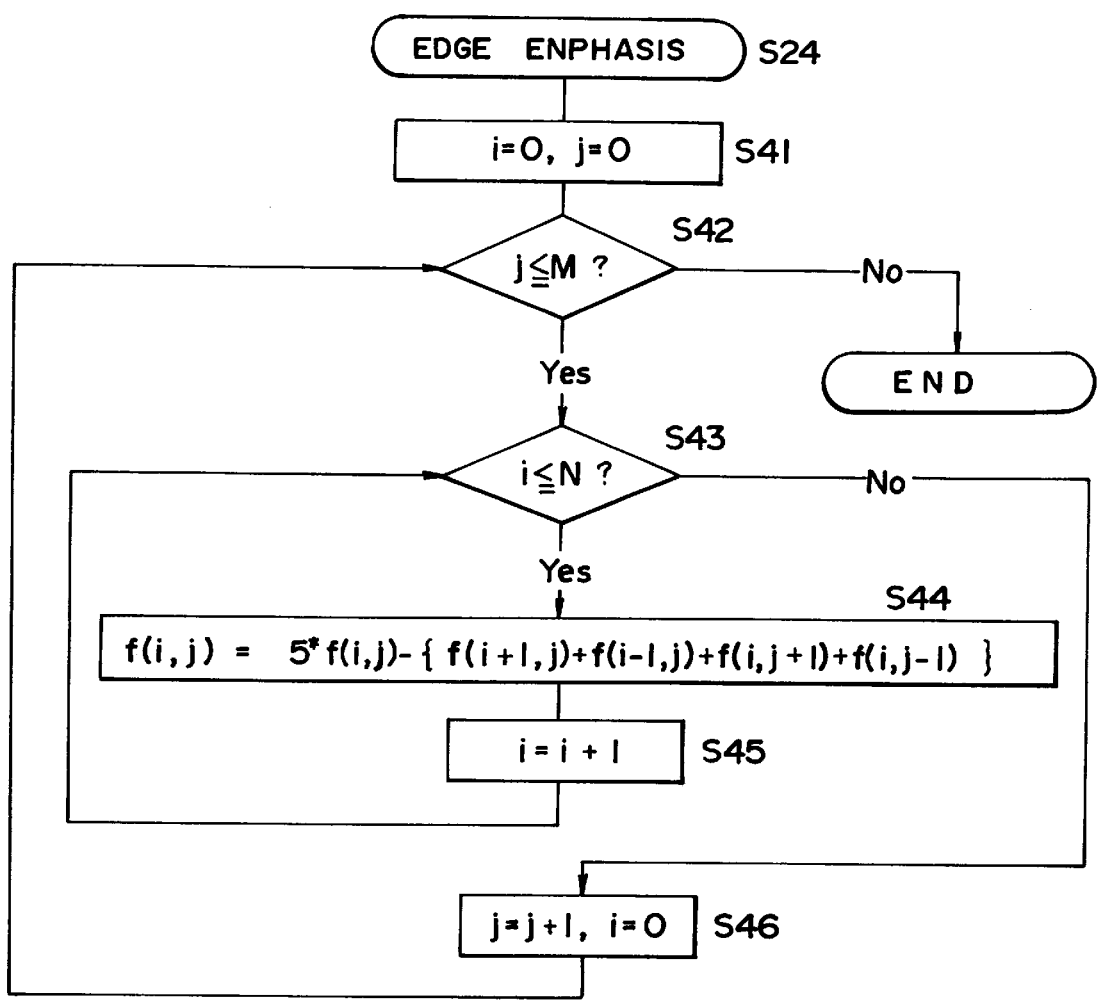
FIG. 10 is a flow chart showing the sequence relating to edge emphasis.

The contrast emphasis process shown in FIG. 7 and the edge emphasis process shown in FIG. 8 may be executed in a combined process. That is, processing may be executed in the following three divisions from the size of each image to be printed. Large image: only edge emphasis executed Intermediate size image: both edge and contrast emphasis Small image: only contrast emphasis The flow charts shown in FIGS. 9 and 10 show typical image processing sequences. FIG. 9 is a flow chart showing an example of a sequence relating to contrast emphasis. FIG. 10 is a flow chart showing an example of a sequence relating to edge emphasis. The images in these examples, comprise picture elements of M rows and N columns; In the flow charts, $f(i, j)$ expresses the density of the image of column i, row j.

The sequence for contrast emphasis is described below with reference to the flow chart of FIG. 9. In the flow chart, images expressed as a certain picture element density (origin density) within a range from 20 to 220 are subjected to contrast emphasis by enlarging the range from 0 to 255.

In step S31, the value of i representing the number of columns, and the value of j representing the number of rows are set at zero [0]. That is, the initial values are set at 0 rows and 0 columns.

Then, under the conditions that the number of rows is less than M and the number of columns is less than N (steps S32, S33), the picture element density f (0, 0) of 0 row and 0 column is calculated. If 0 row and 0 column picture element origin density f (0, 0) is less than 20, picture element density f (0, 0) is forced to density [0], whereas if 0 row and 0 column picture element origin density f (0, 0) is greater than 220, 0 row and 0 column picture element origin density f (0, 0) is forced to 255. When origin density f (0, 0) if greater than 20 but less than 220, the 0 row 0 column picture element density f (0, 0) is calculated after image processing by calculating 255×{f (0, 0)−20}/200. That is, when the origin density os greater than 20 but less than 220, processing is executed to increase the density region from 0 to 255 (step S34).

After determination of f (0, 0) is completed, the value of i is incremented from [0] to [1] (step S35), an the process of step S34 is executed until the column number i attains N columns. Specifically, the process is executed as follows: f(1, 0), f(2, 0), f(3, 0), . . . f(N, 0). That is, all picture elements positioned on the 0 row are subjected to processing to enlarge picture element density f (i, j) (steps S33–S35). If the picture element density is enlarged for all picture elements of the 0 row, this time the value of column number i is set at [0], and only the value of row number j is incremented to [1], and the processes of steps S33 through S35 are repeated. Next, the picture element density is calculated for all picture elements positioned on row 1. (step S26). The aforesaid process is repeated until M row is attained.

When the aforesaid process is completed relative to all picture elements of M rows and N columns, the contrast emphasis process is completed for all picture elements from f(0, 0) to f(N, M).

The edge emphasis process is described hereinafter with reference to the flow chart of FIG. 10. In the flow chart, edge emphasis is accomplished by subtracting the sum of the densities of picture elements at four points positioned on the periphery of picture elements from 5 times the density of said picture elements.

In step S41, the value of i representing the column number and the value of j representing the row number are set at [0]. That is, the initial values are set at 0 rows and 0 columns.

Then, under the conditions that the number of rows is less than M and the number of columns is less than N (steps S42, S43), the picture element density f (0, 0) of 0 row 0 column is calculated. Picture element density f (0, 0) is calculated as follows:

$$5 \times f(0, 0) - \{f(-1,0) + f(0, 1) + f(0,-1)\}$$

That is, the sum of densities f(1,0), f(−1,0), f(0,1), f(0,−1) of four points around f(0,0) are subtracted from five times the density of the image at point f(0, 0). When determining the density at point (0, 0), the determination is actually made from the densities of picture elements at two points (1, 0) and (0, 1) since the picture elements of points (−1, 0) and (0, −1) do not actually exist (step S44).

After determination of f (0, 0) is completed, the value of i is incremented from [0] to [1] (step S45), an the process of step S44 is executed until the column number i attains N columns. Specifically, the process is executed as follows: f(1, 0), f(2, 0), f(3, 0), . . . f(N, 0). That is, all picture elements positioned on the 0 row are subjected to processing to determine picture element density f (i, j) (steps S43~S45).

After the picture element density has been calculated for all picture elements of the 0 row, this time the value column number i is set at [0], and only the value of row j is incremented [1], and the processes of steps S43 through S45 are repeated. That is, the picture element densities of all picture elements positioned on the next row 1 are calculated (step S46). The aforesaid processes are repeated until row M is attained.

When the aforesaid process has been completed for all picture elements of M rows and N columns, the edge emphasis process is completed for all picture elements from f(0, 0) to f(N, M).

Although the present invention has been adapted to a thermal transfer printer in the aforesaid embodiment, it is to be understood that the invention may also be adapted to printers using a variety of methods such as, for example, TA thermal printers, inkjet printers, laser printers and the like.

Although contrast emphasis and edge emphasis have been described in the above embodiment by way of separate flow charts, it is to be noted that edge emphasis of step S24 of FIG. 8 may be executed when the reply to the query of step S13 of FIG. 7 is YES. In accomplishing edge emphasis of step S24 of FIG. 8 with a YES reply to the query of step S13 of FIG. 7, different reference sizes may be set for the reference size to determine whether or not to execute contrast emphasis and the reference size to determine whether or not to execute edge emphasis. For example, the reference size for contrast emphasis may be set smaller than the reference size for edge emphasis, so as to accomplish image processing when an image is smaller than the reference size for contrast emphasis and larger than the reference size for edge emphasis.

In the previously described embodiment, the size of images were compared one by one with reference sizes to determine whether or not to execute image correction corresponding to determination results of image size, but it is to be understood that the present invention is not limited to this embodiment. For example, the shapes shown in FIGS. 4, 5, and 6 may be stored beforehand in program ROM 63 as output formats, and said output formats may be selectable by host computer 60. If the output format is determined in such circumstances, it is possible for CPU 62 to recognize the size of the images without determining the size of individual images, thereby allowing determination of whether or not to perform image processing corresponding to image size. That is, a determination can be made as to whether or not to perform image processing corresponding to the selected output format.

As previously described, the invention provides a printer capable of optimum image processing in accordance with the size of each printed image to produce high quality prints by changing the type of image processing and the amount of correction corresponding to the size of each printed image.

The present invention further provides a printer for printing a plurality of images of different sizes on a single sheet of recording medium, said printer having a means for comparing the size of the images to be printed with a predetermined size and determining whether or not each image is larger or smaller than said predetermined size, and wherein contrast emphasis image processing is executed when an image is smaller than a predetermined image and, edge emphasis image processing is executed when an image is larger than a predetermined image so as to produce high quality prints.

The present invention further provides a printer for printing a plurality of images of different sizes on a single sheet of recording medium, wherein optimum image processing is accomplished corresponding to the size of each image to be printed even when changing the size of the recording medium, changing the number of images to be printed on a single sheet of recording medium, changing the layout of the images to be printed, and changing the size of the images to be printed so as to produce high quality prints.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:
    a detector for detecting a size of a single unit of image data, wherein said unit of image data has a vertical component and a horizontal component that is representative of a frame size of an image to be formed from said unit of image data;
    a first image processor for emphasizing a contrast of said unit of image data so as to adjust an image to be formed from said unit of image data;
    a second image processor for emphasizing an edge of the unit of image data so as to adjust an image to be formed from said unit of image data; and
    a determination unit having a memory means, for storing at least one predetermined image frame size, and a comparator for comparing at least one of the vertical component and the horizontal component of said unit of image data with a thus stored predetermined image frame size;

wherein the determination unit causes said first image processor to utilize a process of contrast emphasis in order to adjust the image to be formed from said unit of image data when at least one of the vertical component and the horizontal component of said unit of image data is smaller than a comparable aspect(s) of the thus compared predetermined image frame size; and wherein the determination unit causes said second image processor to utilize a process of edge emphasis in order to adjust the image to be formed from said unit of image data when at least one of the vertical component and the horizontal component of said unit of image data is larger than a comparable aspect(s) of the thus compared predetermined image frame size.

2. An image forming apparatus comprising:

detecting means for detecting a size of a single unit of image data, wherein said unit of image data has a vertical dimension and a horizontal dimension;

image processing means which is capable of processing said unit of image data so as to adjust an image to be formed from said unit of image data, said image to be formed having a frame size, wherein said image processing means has a first image processing mode and a second image processing mode, said second image processing mode being different from said first image processing mode; and selecting means for selecting said first image processing mode or said second image processing mode according at least one of said vertical dimension and said horizontal dimension.

3. An image forming apparatus according to claim 2, wherein said first image processing mode is a contrast emphasis mode and said second image processing mode is an edge emphasis mode.

4. An image forming apparatus according to claim 3, wherein said selecting means has a memory means for storing at least one predetermined image frame size corresponding to a size of an image to be formed, and a comparing means for comparing at least one of said vertical dimension and said horizontal dimension with a comparable dimension(s) of thus stored predetermined image frame size, wherein said selecting means selects the contrast emphasis mode when at least one of said vertical dimension and said horizontal dimension is smaller than a comparable dimension(s) of thus stored predetermined image frame size, and wherein said selecting means selects the edge emphasis mode when at least one of said vertical dimension and said horizontal dimension is larger than a comparable dimension (s) of thus stored predetermined image frame size.

5. An image forming apparatus according to claim 2, further comprising:

setting means for setting an amount of adjustment by the image processing means according to the frame size of the image to be formed.

6. An image forming apparatus according to claim 5, wherein said first image processing mode emphasizes a contrast of said unit of image data, and wherein said second image processing mode emphasizes an edge of said unit of image data.

7. An image forming apparatus comprising:

memory means for storing a plurality of output frame formats corresponding to a number of images to be outputted onto a single recording sheet;

selection means for selecting a single output frame format among the plurality of output frame formats thus stored in said memory means;

image processing means which is capable of sequentially processing a plurality of units of image data, wherein each said unit of image data represents a respective single frame image, so as to adjust at least one image to be formed from a respective one of said plurality of units of image data; and determining means for determining whether or not said image processing means processes each respective one of said plurality of units of image data with such determining being according to an output frame format selected by selection means.

8. An image forming apparatus according to claim 7, wherein the correct means emphasizes a contrast of the image data.

9. An image forming apparatus according to claim 7, wherein the correct means emphasizes an edge of the image data.

10. An image forming apparatus comprising:

memory means for storing output formats corresponding to the number of images output on a single recording sheet;

selection means for selecting a single output format among the output formats stored in said memory means;

image correct means for correcting the image data, having at least two image correct modes; and select means for selecting the image correct mode, according to the output format selected by the selection means.

11. An image forming apparatus according to claim 10, wherein the image correct means has a contrast emphasis mode and an edge emphasis mode.

12. An image forming apparatus comprising:

memory means for storing output formats corresponding to the number of images output on a single recording sheet;

selection means for selecting a single output format among the output formats stored in said memory means;

image correct means for correcting the image data; and set means for setting a mount of correction of the image correct means, according to the output format selected by the selection means.

13. An image forming apparatus according to claim 12, wherein the correct means emphasizes a contrast of the image data.

14. An image forming apparatus according to claim 12, wherein the correct means emphasizes an edge of the image data.

15. An image forming apparatus comprising:

detecting means for detecting a size of a single unit of image data, wherein said unit of image data has a vertical component and a horizontal component that is representative of a frame size of an image to be formed from said unit of image data;

image processing means for emphasizing a contrast of said unit of image data or an edge of said unit of image data so as to adjust an image to be formed from said unit of image data; and determining means for determining whether or not said image processing means processes said unit of image data, such a determination being based on at least one of said vertical component and a horizontal component;

wherein said determining means has a memory means, for storing at least one predetermined image frame size, and a comparator for comparing at least one of said vertical component and a horizontal component with a comparable aspect(s) of thus stored predetermined image frame size;

wherein said determining means causes said image processing means to utilize a process of contrast emphasis in order to adjust the image to be formed from said unit of image data when at least one of said vertical component and said horizontal component is smaller than a comparable aspect(s) of the thus compared predetermined image frame size; and wherein said determining means causes said image processing means to utilize a process of edge emphasis in order to adjust the image to be formed from said unit of image data when at least one of said vertical component and said horizontal component is larger than a comparable aspect(s) of the thus compared predetermined image frame size.

16. An image forming apparatus comprising:

memory means for storing output frame formats corresponding to frame images to be outputted onto a single recording sheet;

selecting means for selecting a single output frame format among the output frame formats stored in said memory means;

image processing means which is capable of emphasizing a contrast of a unit of image data or an edge of a unit of image data so as to adjust an image to be formed from said unit of image data, wherein said unit of image data represents a captured image; and determining means for determining whether said image processing means emphasizes the contrast of said unit of image data or the edge of said unit of image data according to the output frame format selected by said selecting means.

17. An image forming apparatus comprising:

a memory for storing output frame formats corresponding to a number of frame images having a frame size to be outputted onto a single recording sheet;

a selector for selecting a single output frame format among the output frame formats stored in said memory;

an image processor which is capable of emphasizing a contrast of a unit of image data or an edge of said unit of image data so as to adjust an image to be formed from said unit of image data, wherein said unit of image data represents a single image frame embodying a captured image; and a setting unit for setting an amount of adjustment, of the image to be formed from said unit of image data, by the image processor according to the output frame format selected by said selector.

18. An image forming apparatus comprising:

a detector to detect a size of a single unit of image data, wherein said unit of image data represents a single image frame read from a photographic film having at least one image frame;

a first image processor to emphasize a contrast of said unit of image data so as to adjust an image to be formed from said unit of image data, said image to be formed having a frame size;

a second image processor to emphasize an edge of the unit of image data so as to adjust an image to be formed from said unit of image data; and a determination unit having a memory means to store at least one predetermined image frame size and a comparator to compare a detected size of said unit of image data with a thus stored predetermined image frame size;

wherein the determination unit causes said first image processor to utilize a process of contrast emphasis in order to adjust the image to be formed from said unit of image data when the detected size of said unit of image data is smaller than the thus compared predetermined image frame size; and wherein the determination unit causes said second image processing means to utilize a process of edge emphasis in order to adjust the image to be formed from said unit of image data when the detected size of said unit of image data is larger than the thus compared predetermined image frame size.

19. An image forming apparatus comprising:

detecting means for detecting a size of a single unit of image data, wherein said unit of image data has a vertical component and a horizontal component that is representative of a frame size of an image to be formed from said unit of image data;

image processing means for performing a first image processing or a second image processing, wherein said first image processing and said second image processing are different; and determining means for determining whether or not said image processing means processes said unit of image data, such a determination being based on at least one of said vertical component and a horizontal component;

wherein said determining means has a memory means, for storing at least one predetermined image frame size, and a comparator for comparing at least one of said vertical component and a horizontal component with a comparable aspect(s) of thus stored predetermined image frame size;

wherein said determining means causes said image processing means to subject a unit of image data to said first image processing when at least one of said vertical component and said horizontal component is smaller than a comparable aspect of the thus compared predetermined image frame size; and wherein said determining means causes said image processing means to subject a unit of image data to said second image processing when at least one of said vertical component and said horizontal component is larger than a comparable aspect of the thus compared predetermined image frame size.

* * * * *